Dec. 24, 1968  F. R. GYDESEN  3,418,471
VISUALIZING INTERNAL STRUCTURE
Filed Nov. 7, 1963  6 Sheets-Sheet 1

INVENTOR.
FREDERICK ROBERT GYDESEN
BY
Richard Hauser
ATTORNEY

INVENTOR.
FREDERICK ROBERT GYDESEN
BY
ATTORNEY

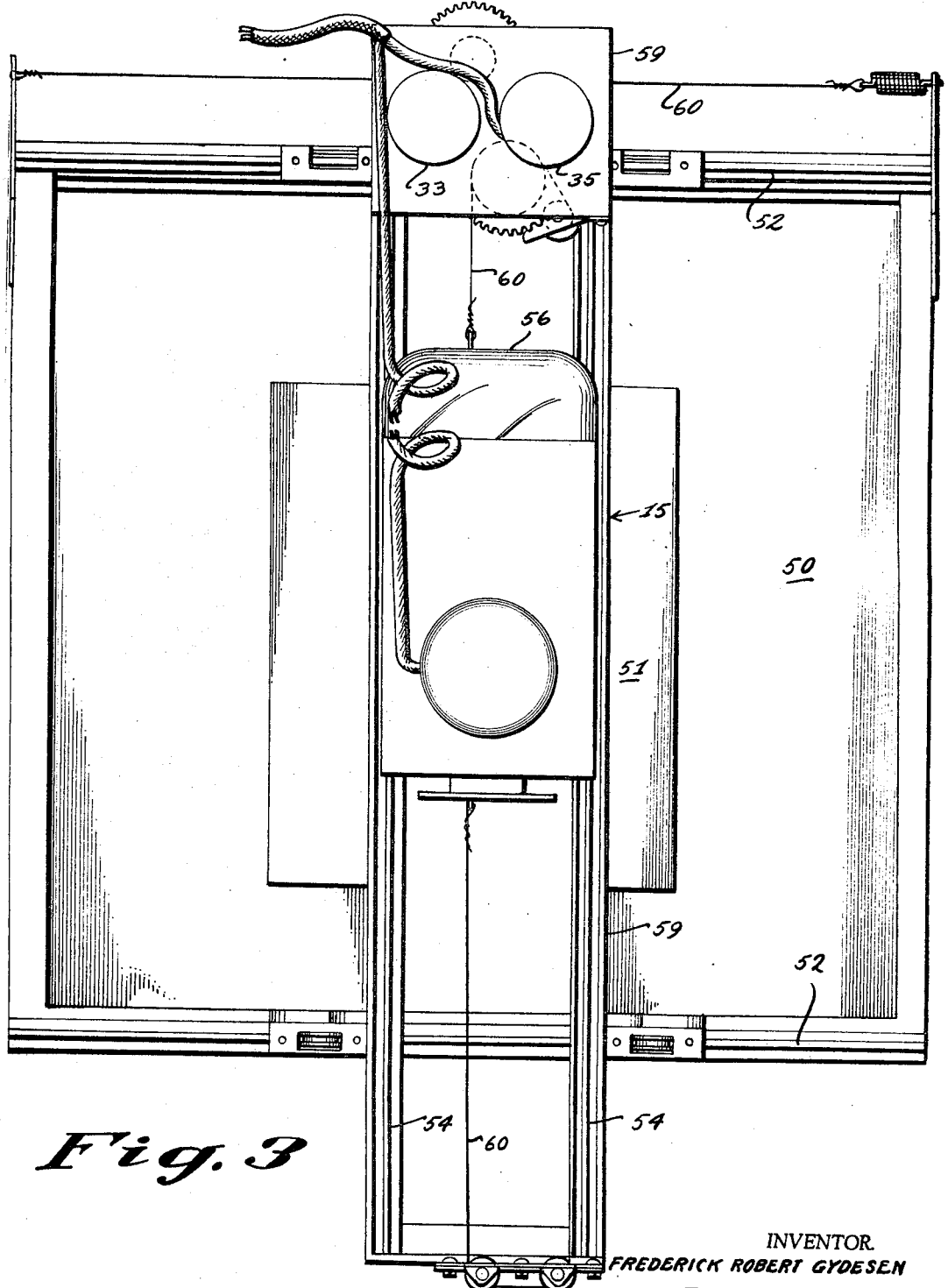

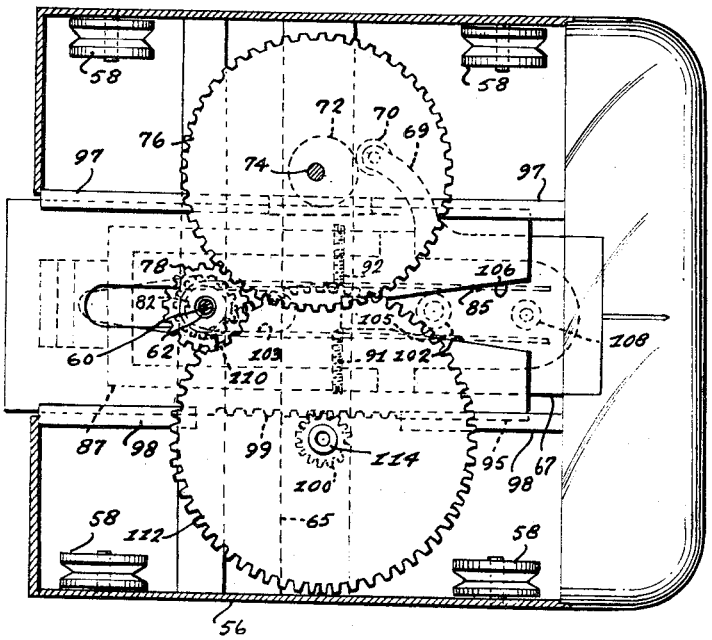
Fig. 4
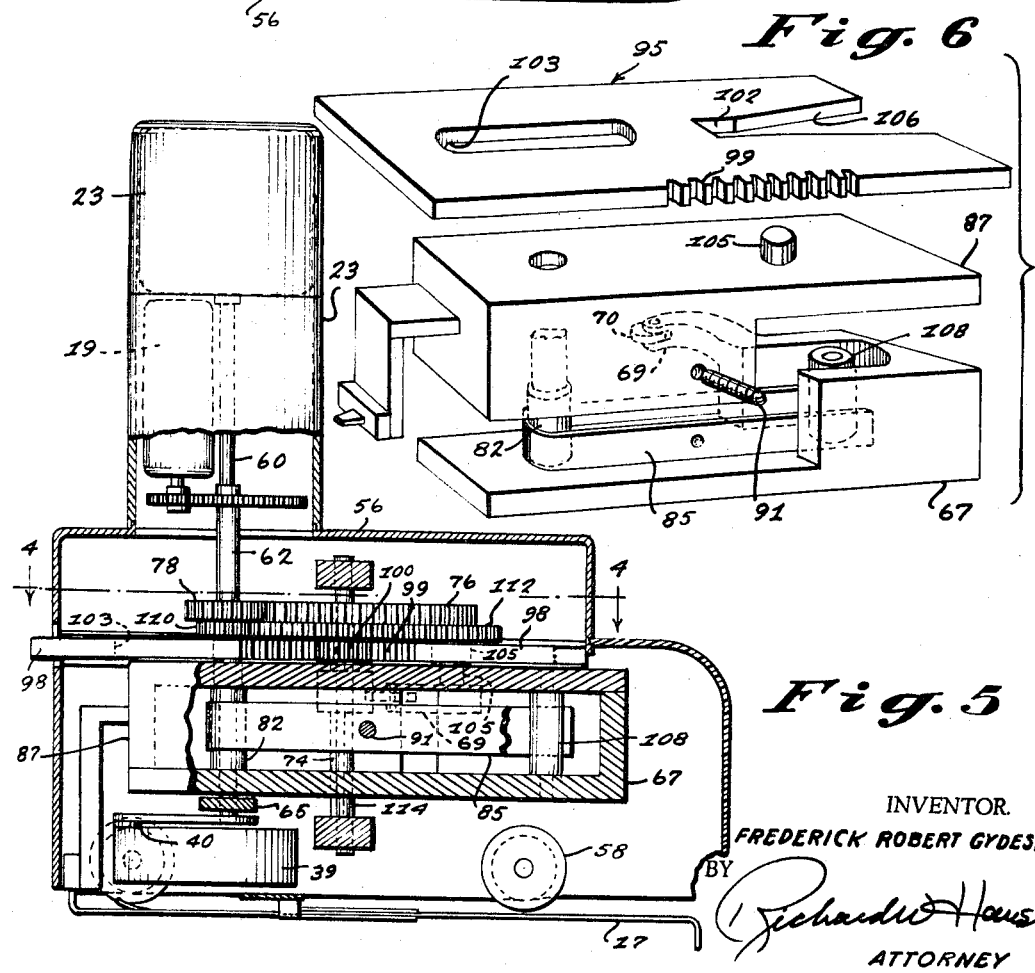
Fig. 6
Fig. 5
INVENTOR.
FREDERICK ROBERT GYDESEN
BY
Richard W Hause
ATTORNEY

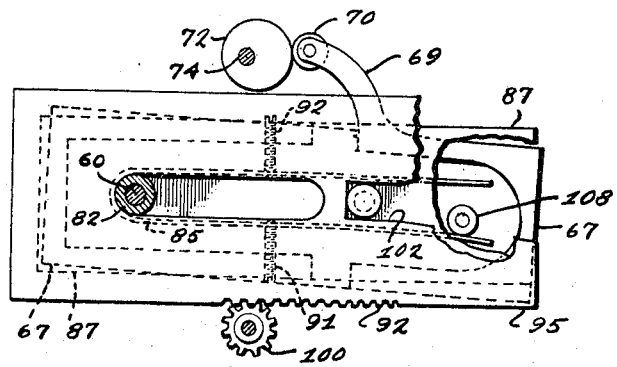
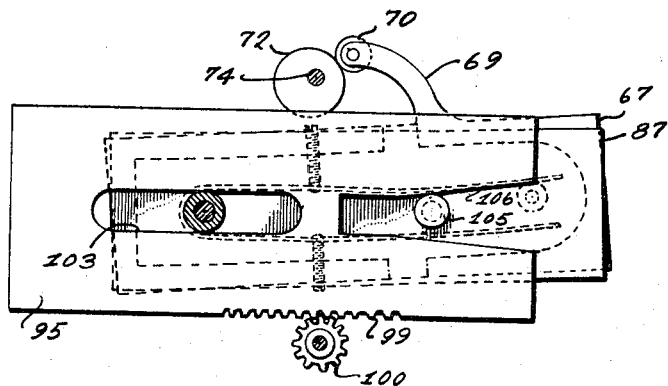
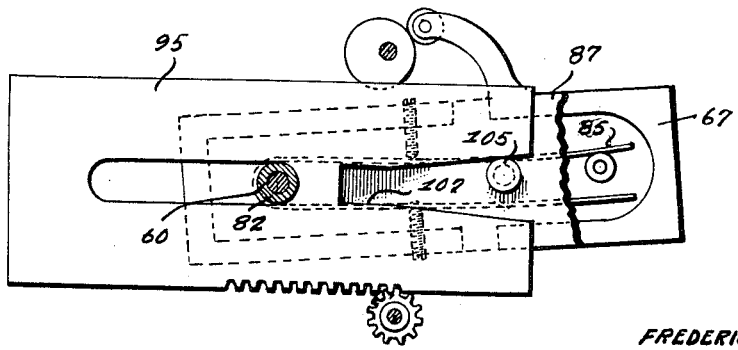

Dec. 24, 1968   F. R. GYDESEN   3,418,471
VISUALIZING INTERNAL STRUCTURE
Filed Nov. 7, 1963   6 Sheets-Sheet 6

INVENTOR.
FREDERICK ROBERT GYDESEN
BY
ATTORNEY

United States Patent Office 3,418,471
Patented Dec. 24, 1968

3,418,471
VISUALIZING INTERNAL STRUCTURE
Frederick Robert Gydesen, Colorado Springs, Colo., assignor of twelve percent to Richard W. Hanes, Colorado Springs, Colo.
Filed Nov. 7, 1963, Ser. No. 322,233
4 Claims. (Cl. 250—71.5)

The present invention relates generally to oscillographic recording methods and apparatus and more specifically to a method of synthesizing detected radiation values of pattern elements constituting a given pattern in an area of interest.

Gathering information point by point by scanning techniques for the synthesizing of a pattern or picture is a well developed art, however, the manner in which the results are finally displayed has varied considerably and is beset with difficulties, which the present invention substantially overcomes. Although many fields of activity are covered by the method and apparatus as broadly disclosed herein, primary emphasis, for purposes of disclosure, will be given to the method as it applies to scanning of radioisotopes injected into a body or which are positioned relative to a body so that radiation through or from the body will follow the outline or pattern of imperfections or impurities which may be found therein. Since its inception over a decade ago, radioisotope scanning has been employed in the field of medicine to study the organs of the body, and because of the obvious necessity for limiting the amounts of radioactive substances placed in the body of a human being and the corresponding requirement for an acuate display of the organ under study, several different methods for transposing the data received in the scan to a meaningful picture are currently in use.

The most popular method includes mechanical rectilinear scanning by a scintillation crystal detector of the area being studied and transmitting the received data in suitable form to apparatus which prints out or draws a picture of the pattern formed in the organ by the differential absorption of radioactivity in the various types of tissues. Most of the apparatus adapted to this method makes common use of a collimated scintillation crystal driven by a constant speed scanning drive means; they differ only in respect to the display or printout means.

One widely used product employs an impact printer striking carbon backed reproduction paper in response to a preselected accumulation of radiation impulses registered by the detector. By totalling the number of events that have occurred since the last point was imprinted on the record and by displaying only a preselected ratio of impulse counts totalled per recorded event the system becomes an integrating system. A number of deficiencies are evident in the integration technique, chief among these being the principle of integration itself. With a high uptake of radioactivity the total counts collected per impact dot must be made very high resulting in loss of detail in an area of low uptake. Conversely, with a low uptake, the sensitivity must be set so high that random fluctuations of activity within the organ and from the background radiation becomes a serious problem. Another difficulty with the integrating read out device is that the exact point where individual events occur cannot be determined from the record and can only be approximated by selecting a proper scaling ratio to emphasize the density of printout symbols over the area of interest.

A second prior art device, the "photoscan," was devised to abridge some of the mechanical problems of the dot printer, but suffers from its own disadvantages. This system places the scintillation crystal detector at the input of a conventional ratemeter whose output modulates the intensity of a small lamp scanning over photosensitive paper in a light tight box. The record is not available until the photographic film is processed and printed. An extension of the "photoscanner" principle combines the modulation of light intensity with the principle of the previously mentioned integration device and the final photographic exposure of a recorded event is controlled by the integration counter. These methods necessitate the use of expensive paper and the inconvenience of darkroom handling and in addition to these difficulties, the operator is unable to monitor the results of the scan as it progresses nor is there an easy method for duplicating scans. Notwithstanding their disadvantages these methods work satisfactorily where the radioactivity is high and the delineation is sharp, as with a high differential absorption ratio in the object under study, but in cases of low uptake or high background activity, the resolution is poor. The differential absorption ratio is the ratio of the amount of radioactivity deposited in the area of interest to that of surrounding tissue. In this connection, much effort has been expended in eliminating the background and increasing the record contrast while still attempting to retain the characteristic advantages of the integrating and dot print systems. One of these prior efforts employs a counting rate cutoff circuit which stops the printing process when the count rate falls below a preselected level. A second method utilizes the logarithmic response of film to light to increase the contrast between background to radioactive organ burden. There are two main objections to these methods, however. In using the counting rate cutoff circuit, there is no record obtained over areas which exhibit below cutoff radiation. In the light recording method, a density saturation is quickly reached over a short range and information above and below this range of response is lost.

Having the previously mentioned disadvantages of the prior art well in mind, it will be easily appreciated that the primary objective of the present invention is to provide a means for displaying the point by point information gathered by a scan, which display is continuous and is characterized by high resolution and improved contrast.

A second object of the invention is to provide a display means of the type described capable of continuous monitoring during an entire scan with a high rate of data accumulation.

Another object of the invention is to provide a simple and effective means for eliminating from the permanent record any evidence of background radiation.

A still further object of the invention is the provision of means for producing an immediately visible trace which is permanent in nature and readily lends itself to copying and reproduction.

Other objects will be in part apparent and in part pointed out specifically hereinafter in connection with the detailed description of the invention in connection with the accompanying drawings, in which:

FIGURE 1 is a block diagram of the system embodied in the present invention.

FIGURE 3 is a top plan view of the X–Y plotter mechanism and the driven pen assembly of the apparatus of the present invention.

FIGURE 4 is a cross-sectional view of the preferred embodiment of the pen assembly of the present invention taken along lines 4—4 of FIGURE 5.

FIGURE 5 is a side elevational view of the pen assembly with a portion thereof broken away and shown in cross-section.

FIGURE 6 is an enlarged exploded view of the pen fixture, driver element and control member.

FIGURE 7, FIGURE 8, and FIGURE 9 are diagrammatic views of the pen fixture as it relates to the driver element and control member during operation of the device.

Figure 10:
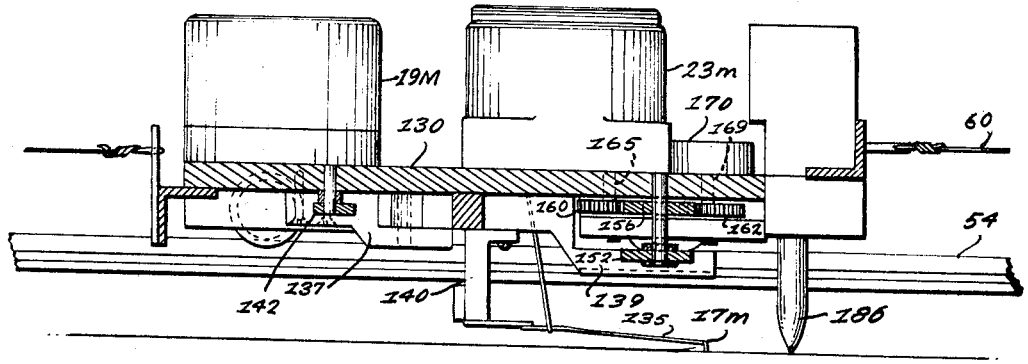

FIGURE 10 is a side elevational view of a second embodiment of the pen assembly with a portion thereof broken away and shown in cross-section.

Figure 11:
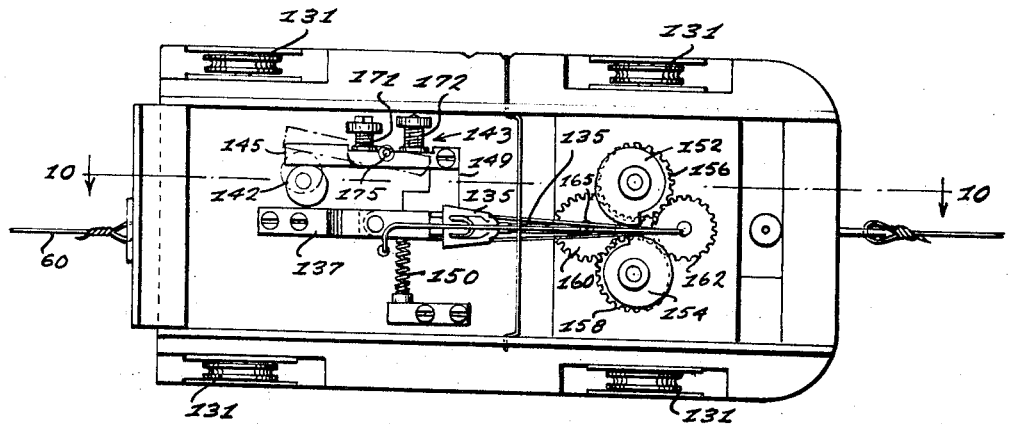

FIGURE 11 is a bottom plan view of the pen assembly shown in FIGURE 7.

Figure 12:
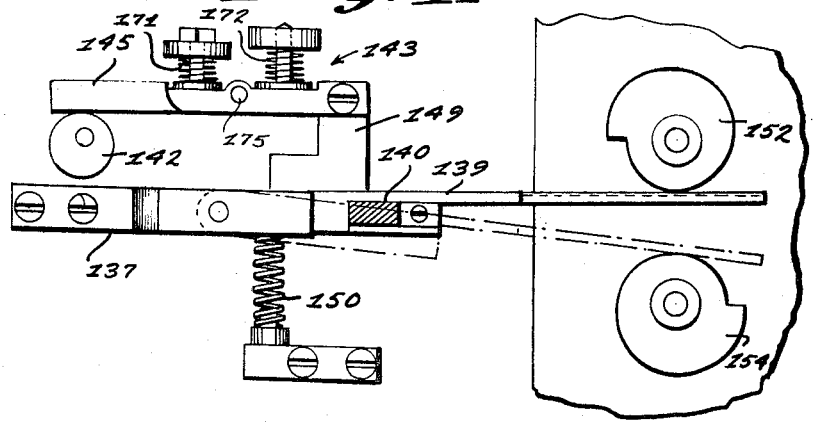

FIGURE 12 is an enlarged fragmentary view of the pen broken link connection and control members of the embodiment of FIGURE 7 and FIGURE 8 with a second position of the pen shown in broken lines.

FIGURE 13 is a combination block and functional diagram of a third embodiment of the trace producing means of the display apparatus, utilizing a galvanometer and light source in place of a pen.

Broadly stated, the process which forms the subject matter of the present disclosure comprises the steps of scanning a field of interest, receiving data therefrom, generating an electrical quantity proportional to the intensity of the received data and amplitude modulating a lineal recorder trace as a function of the electrical quantity generated. Preferably, the apparatus for producing the amplitude modulation display comprises a record receiving medium, a pen and separate means to move the pen both laterally and longitudinally with respect to the record medium. A conventional X-Y coordinate plotting mechanism may serve to move the pen longitudinally while for lateral movement the pen is pivotally mounted for oscillation in a plane parallel with the plane of the record medium and means are included to apply a constantly alternating lateral force to the pen during the record making process to oscillate it about iits pivot point, however, the extent of the pen's oscillation is controlled as a function of the interspace separating a pair of bilateral control members between which a portion of the pen is disposed for restraint. The interspace is controlled by a servomechanism system whose output is operably connected to the control members and whose input is derived from the data received by the system.

When employing the process of the invention in the study of the characteristics, impediments, or defects of a body, such a human thyroid or a metal casting, the crystal detector is preferably carried by a rectlinear scanner head which is moved by appropriate means well known in the art over the body to be scanned in a predetermined sequence of narrow, straight parallel strips. The scanner head is equipped with conventional synchro transmitters whose output is fed to corresponding synchro receivers which furnish the power to operate the X-Y coordinate plotting mechanism carrying the previously described display-producing pen apparatus. The synchro systems enables the pen assembly to precisely emulate the movements of the detector's scanning head.

Referring now to FIGURE 1 of the drawings, it is seen that the output of the scintillation crystal 5 and the photomultiplier tube 6, which together comprise the scanning detector 7, is fed to a conventional precision ratemeter 9 whose D.C. voltage output is proportional in magnitude to the rate of occurrence of the electrical pulses received from the scanning detector 7. After passing through a signal level selector 11, whose function will be later explained, the positive D.C. voltage from the ratemeter is introduced to a modulation amplifier 12, which, together with the pen assembly 15 and a feedback network 18, forms a "servo" loop. The pen assembly 15 includes a trace producing pen 17, a mechanically coupled oscillating force motor 19, pen modulation control members 21, and a servo motor 23 which drives the control members. The modulation amplifier 12 employs a D.C. chopper 25 feeding an A.C. motor amplifier 27 to drive the servo motor 23 in the pen assembly 15. The servo control loop is conventional in that the phase relationship of the output of the A.C. motor amplifier 27 establishes the direction of the servo motor rotation and position feedback voltage is supplied to the modulation amplifier 12 from a pen assembly potentiometer 39 whose wiper arm 40 is mechanically coupled to the output shaft of the servo motor 23. The negative nulling voltage is fedback from the potentiometer 39 to the input of the modulation amplifier 12 to cancel the positive input voltage signal when the correct modulation amplitude has been established for the pen by the modulation control means 21.

In operation, the output from the ratemeter 9 and modulation amplifier 12 drive the pen servo motor 23 to provide greater or lesser interpace between the pen control members 21 thus controlling the lateral oscillatory excursions of the pen 17 to form a proportionally amplitude modulated line. Under conditions of zero input to the modulation amplifier 12 the control member interspace prevents any lateral movement of the pen 17 and the trace remains a straight unmodified line. On the other hand, the presence of an input signal to the amplifier manifests a given freedom of oscillation for the pen's lateral "modulating" movement and the pen trace is amplitude modulated as a direct function of the intensity of the radiation received by the detector 7. The area of average radiation activity is determined in the field of interest and the widest desired deflection of the amplitude modulated line is selected by proper adjustment of the signal level selector, which may be any well known means for controlling the voltage level which is fed to the D.C. chopper 25. Thus the amount of activity radiating from discrete points in the body scanned can be estimated by the modulated line width. The pen assembly is made to follow the scanning movements of the motor driven detector 7 by a pair of X and Y synchro systems whose transmitters 29 and 31 are mechanically coupled to the detector and whose receivers 33 and 35 drive the pen assembly.

When working with low tracer radiation levels background radiation contributes a certain nuisance value and unless its effect is removed from the visible trace it detracts from the contrast and resolution of the display. To overcome this difficulty in apparatus of the present invention, negative voltage is introduced to the chopper input through the signal level selector 11 and an adjustment of the level of the negative bias source 37 may be made in order to cancel out or "erase" the positive D.C. input voltage representing background count. Any D.C. signal which is greater than the so-called "erase" voltage will activate the servo motor 23 in the manner already described so as to cause modulation of the straight line trace normally produced by the recorder pen 17.

In scanning and recording systems of the prior art good resolution is difficult to maintain when working with small levels of radiation or when the injected body possesses a low differential absorption ratio because the radiation count per unit length of scan travel is insufficient. While it may be impractical or impossible to increase the radiation, the scan speed may be reduced to increase the count per unit length ratio. However, to avoid a substantial increase in the total scanning time which such a solution would produce, the instant apparatus provides for slowed scanning speed only over areas in which the radiation exceeds a given threshold level. The detector drive motor 43 is regulated to one of two available speeds by a thyratron operated motor control circuit 45 so that the scanning speed is high over most areas but is slow over the areas of interest. The thyratron control tube in the motor control circuit 45 is biased to cutoff by a signal from the ratemeter to reduce the drive motor voltage in a manner well known in the electrical art. The change of scan speed does not adversely effect the quality of the record since the modulated line display is a record of the differential time rate of activity as seen by the scintillation crystal detector. The change of scan speed conditions do demand, however, that the response time of the servo loop over a given radioactivity gradient be several orders of magnitude smaller than the gradient being detected by the crystal. If such a condition is not met a state of imbalance will occur when scanning gradients of activity and the resulting display will not be a true representation of the detected gradient.

Normal scanning speed can of course vary depending upon the application and circumstances, however, a speed of nine inches per minute has been found to be very satisfactory when scanning tracer induced human organs such as a thyroid with a ¾ x 1 inch crystal and a ¼ inch single hole collimator. Line spacing on the display record can also be varied to accommodate different requirements, however there is an optimum spacing for best results. If the spacing is too wide, information will be lost, while on the other hand, placing the lines very close together results in undue limiting of the modulation latitude and unnecessary scanning time. Spacing of ten lines per inch is a good compromise.

Figure 2A:
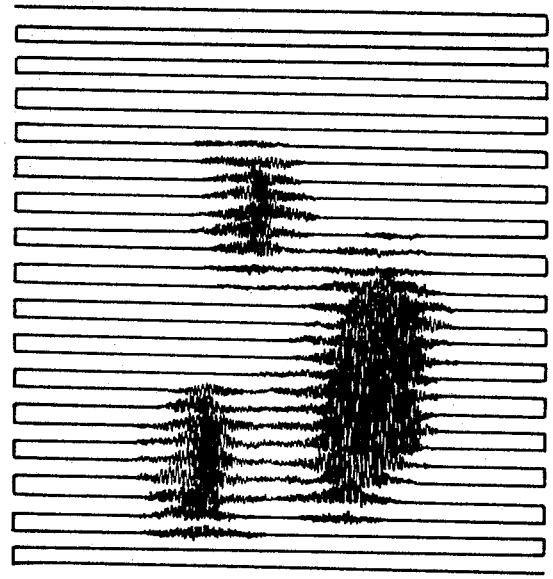
FIGURE 2a and FIGURE 2b are sample displays made by the apparatus of the present invention and represent scans of an abnormal and normal human thyroid gland.
Figure 2B:
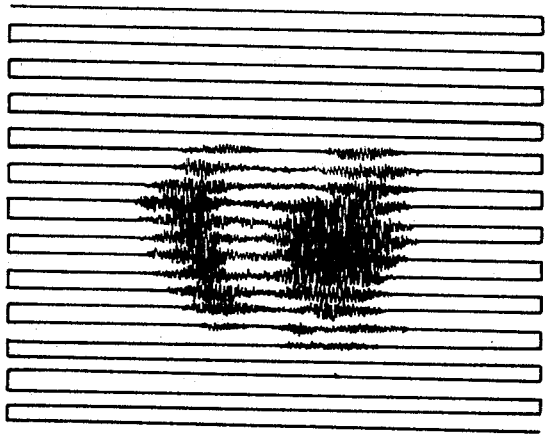

FIGURES 2a and 2b illustrate typical display patterns produced as described above. These figures illustrate the display produced by horizontally scanning the thyroid glands of patients who were administered 100 microcuries of sodium radioiodide twenty-four hours prior to being scanned. The thyroid pictured in FIGURE 2b represents a normal gland while the one of FIGURE 2a contains a distinct pyramidal lobe.

Considering now the mechanical details of the pen assembly, the X–Y plotting system comprising the display unit is seen in FIGURE 3 to include a platform 50 on which the record paper 51 is supported and two pairs of mutually perpendicular parallel rails 52 and 54 by which the pen assembly 15 is carried. The elements of the pen assembly are mounted on a carriage 56 having four rotatably mounted wheels 58 adapted to ride on one pair of parallel tracks 54 which may be referred to as the Y tracks. Likewise, the frame 59 which carries the Y tracks is equipped with small wheels or running gear (not shown) which ride on the fixed parallel X tracks 52. Also mounted on the Y track frame 59 are the X and Y synchro receivers 33 and 35 which are arranged with suitable gears and pulleys to wind up and pay out the drag lines 60 for pulling the Y track frame 59 and the carriage 56 in response to signals generated by the synchro transmitters 29 and 31 operated by the detector scanning head 7. Further detail concerning the X–Y plotting mechanism is redundant in this description in view of the familiarity of the art with such a device.

In the views of FIGURES 4 and 5, the preferred form of the carriage mounted pen assembly is illustrated as having a pair of concentric vertical input shafts 60 and 62 which are connected respectively to the output gearing of the servo motor 23 and oscillating force motor 19 which are mounted in stacked relationship on top of the carriage 56. Four carriage running wheels 58 are mounted near the four corners of the carriage 56. Also attached to the walls of the carriage is a frame 65 to the top side of which is pivotally attached a driver element 67 having a laterally extending follower finger 69 with a rowel 70 which abuts the sliding edge surface of an eccentrically mounted cam 72. The cam 72 is carried by a downwardly extending spindle shaft 74 which also carries a large speed reduction gear 76 meshing with a smaller gear 78, which is mounted on the oscillating force motor shaft 62 geared to the output of the constantly rotating oscillating force motor 19 which operating connection results in constant lateral oscillation of the driver element 67 about its pivotal mounting as the follower finger 69 follows the rotating eccentric cam 72.

An upstanding bushing 82 coaxially positioned at the pivot point of the driver element 67 serves as an end support for the closed end of an elongated U shaped spring 85 which establishes a flexible linkage between the driver element 67 and a driven superposition pen fixture element 87 which is pivotally secured to the aforementioned bushing by the extended end of the inner one 60 of the concentric motor shafts inserted through an aperture in the pen fixture element and down through the bushing 82 and driver element 67 into a journal in the frame plate 65. The U shaped spring linkage 85 acts to transfer the limited lateral oscillations of the driver element 67 to the pen fixture 87 through a pair of opposed set screws 91 and 92 which extend inwardly from the depending side walls of the pen fixture element to make contact with the straight sides of the linkage spring 85.

To control the extent of the lateral excursions, or "modulations" of the pen fixture, a slidably mounted control member 95 is employed in juxtaposition to the pen fixture 87 to limit movement thereof. The control member 95 is constructed of a flat horizontal plate supported by a pair of opposed channels or guides 97 and 98 fastened to the walls of the carriage 56 and is provided with rack gear teeth 99 along the mid portion of one side to engage a pinion gear 100. One end of the plate is notched in a V shape with the apex thereof terminated by a short parallel sided cut 102 along the longitudinal center line of the plate 95. The extended end of the inner drive shaft 60 protrudes through an elongated slot 103 in the plate 95 as it rests in the channel guides 97 and 98 above the pen fixture 87. There is fixed to the top surface of the pen fixture 87 a protruding stud 105 extending into the V shaped notch 106 of the control plate 95. Through the operation of the pinion gear 100 and rack 99 the control member can be made to slide forwardly or rearwardly so as to provide a continuously variable distance through which the protruding pen fixture stud 105 can travel before striking the sides of the control member notch 106. At the extreme forward position of control member travel (see FIGURE 7) the stud is located in the parallel sided apex portion 102 of the notch 106 and no lateral movement of the pen fixture is permitted. As the driver element oscillates back and forth an upright linkage stud 108 located along the longitudinal center line of the driver element 67, alternately pushes the sides of linkage spring 85 outwardly, as shown in FIGURES 7, 8, and 9. The force exerted on the side of the linkage spring is transferred to the pen fixture through the set screws 91 and 92 resulting in a similar pivotal movement by the pen fixture 87 to the extent allowed by the control member. In FIGURE 7 the control member 95 is shown in a position restricting any lateral movement of the pen fixture 87 at a time when the driven element is at its extreme of lateral travel. The illustration of FIGURE 8 shows the limited oscillation of the pen fixture 87 which is permitted by a partial rearward movement of the control member 95 while FIGURE 9 depicts the condition of complete following by the pen fixture when the control member is in its most rearward position. In FIGURES 7 and 8 it is apparent that when the pivotal motion of the pen fixture is restricted in whole or in part the sides of the spring being pushed outwardly merely bend around the point of contact with the set screw.

The longitudinal back and forth movement of the control member 95 is dictated by the position assumed by the servo motor 23 which is operably connected to the control member through the inner shaft 60, an attached drive gear 110 and a meshing speed reduction gear 112 which carries the driving pinion gear 100 on a coaxial spindle 114. Also connected to the servo motor shaft is the wiper arm 40 of the servo position feedback potentiometer 39 whose function has already been outlined.

The pen assembly construction is completed by mounting on the pen fixture 87 a recording pen 17 and an appropriate means for supplying writing ink thereto.

A second embodiment of the carriage and pen assembly is seen in FIGURES 7 and 8. Similar to the preferred form, a body frame plate 130 is carried along the Y tracks by a series of four corner wheels 131. Mounted on the top side of the frame plate 130 are the oscillatory force motor 19m and the servo drive motor 23m whose output shafts extend downwardly through the frame plate to operate the pen drive and control means. A pen stylus support frame 135 is positioned beneath the carriage frame 130 and arranged to bring the pen stylus 17m in contact with the display record paper 51. Attached to the underside of the carriage frame 130 is a bracket member 137 which provides a pivotal support for the horizontal oscillations of the pen control arm 139 to which the pen support frame is connected by a vertical mounting stud 140 depending from and attached to the control arm 139.

An eccentric cam 142 on the output shaft of the oscillatory force motor 19m provides the oscillating drive power for the pen control arm 139 through a broken link mechanism 143, the follower arm 145 of which is maintained in constant sliding contact with the edge surface of the cam 142 while the crank arm 149 of the linkage is rigidly attached to the pen control arm 139. The broken link mechanism and cam being on one side of the pen control arm, there is positioned on the opposite side of the arm 139 a compression type biasing spring 150 which maintains a constant lateral force on the control arm 139, thus keeping the linkage follower arm 145 in constant contact with the cam 142.

The free end of the pen control arm 139 is placed between a pair of spaced apart coplanar control cams 152 and 154 also located beneath the carriage frame 130 whose centers of rotation are concentric with a pair of freely rotatable spaced apart cam drive gears 156 and 158. Directly above the longitudinal center line of the pen control arm are located the centers of two intermediate spaced apart gears 160 and 162 whose teeth engage the teeth of both of the cam drive gears 156 and 158. The rearward one of the intermediate gears is mounted on the output drive shaft 165 of the servo motor 23m and thus as the servo motor is turned in one direction by a modulation signal, counter rotation is established in the two cam drive gears 156 and 158 and results in a symmetric opening or closing of the interspace between the control cams 152 and 154 with the pen modulating the line trace proportionally to the signal level. When operating without a modulation signal input to the servo amplifier, the biasing voltage in the servo system, which is similar to the one described for the preferred embodiment, acts to close the control cams to a position preventing any lateral movement of the pen control arm 139. The shaft 169 of the forward one of the intermediate gears is connected to the wiper arm of the servo position feedback potentiometer 170 which is placed above the carriage frame 130.

The operation of the broken link connection is well known in the art and it will therefore suffice to state that when the control arm 139 is free to move laterally the link spring members 171 and 172 exert sufficient force against the crank arm and follower finger that they move as one rigid unit, however, if the control arm is to any extent restricted in its lateral excursions the springs 171 and 172 will yield and the link breaks at its pivot point 175 which interconnects the follower finger 145 and crank arm 149.

The modified carriage of FIGURE 10 also includes a conventional drawing pen 186 which may be lowered onto the display paper to reproduce body outlines, like for example, an outline of the head, to establish a relationship and setting for the scan display produced.

To accommodate higher frequency requirements which cannot be met by pen recorders, a third embodiment of apparatus is provided which is illustrated functionally in FIGURE 13 of the drawings. A light beam is employed in place of the pen and produces a trace on a photosensitized medium. A conventional galvanometer 201 comprising a light reflecting mirror 204 mounted on a bifilar winding 206 is secured to a carriage (not shown) which is similar to the carriage 56 shown in FIGURE 3. The mirror galvanometer 201 is mounted in such a position that a light beam 210 coming from a source of light 212 is reflected by the mirror 204 onto the sensitized record medium positioned adjacent the carriage.

A low frequency oscillator 215 supplies an A.C. voltage of constant frequency to a voltage divider 217 and from a variable tap 219 a portion of the A.C. voltage is fed to the galvanometer coil 206. In accordance with well known galvanometer principles, the mirror 204 oscillates about a pivotal axis at the same frequency as that of the voltage supplied to the coil 206, thus moving the light beam laterally back and forth on the record medium. The voltage divider 217 acts as a means to limit the extent of the lateral excursions of the light beam 210 by controlling the magnitude of voltage supplied to the galvanometer coil 206. To accomplish the control, the variable tap 219 is mechanically gauged to the servo motor 23m' in order that the electrical limiting means will be controlled in the same fashion as the mechanical limiting means described in the two pen embodiments. Thus, it is seen that the light beam 210 will produce a straight line trace when the variable tap 219 is positioned at the zero voltage end of the divider 217 (assuming, of course, that there is relative movement between the record carrier and the galvanometer) and will produce an amplitude modulated line when an A.C. voltage is present across the galvanometer coil 206. The degree of amplitude of the modulation will be a direct function of the magnitude of the voltage delivered by the variable tap 219 and the frequency will be that of the oscillator 215. While a carriage type of support for the trace producing means has been consistently referred to in this specification, it is to be understood that any form of mechanism or apparatus which establishes relative movement between the record carrier medium and the trace producing means (whether it be pen or light) may be employed to achieve the advantages of the present invention.

Having thus described the several useful and novel features of the modulated line display of the present invention in connection with the accompanying drawings, it will be seen that the many worthwhile objectives for which it was designed have been achieved. In addition to the specific applications which have been described for the display method it should be mentioned that the system lends itself especially well to the presentation of double parameter displays on a coordinate axis base. For example, in recording the output of a panoramic radio receiver the magnitude of line width modulation could well represent signal strength of a detected signal plotted against time and frequency. Certain modifications of the apparatus also may occur to those skilled in the art within the broad teaching hereof; hence, it is my intention that the scope of protection afforded hereby shall be limited only insofar as said limitations are expressly set forth in the appended claims.

I claim:
1. Apparatus for synthesizing detected radiation values of pattern elements constituting a given pattern, comprising;
    a scintillation detector having an output;
    motor means operably coupled to the detector, for driving the detector in a scanning operation;
    a ratemeter electrically connected to the output of the detector;
    display producing means;
    synchro means operably interconnecting the detector and the display producing means so that the movements of the latter will be controlled by the former;
    said display producing means including;
        a recording stylus;
        pivotally mounted fixture means on which the stylus is mounted;
        a first motor having an output shaft;

a cam eccentrically mounted on the shaft of the said first motor for rotation therewith;
pivotally mounted follower means in contact with the cam;
a flexible linkage operably interconnecting the follower means and the said fixture means;
control means positioned on each side of the pivotal fixture means and arranged to provide a variable interspace therebetween;
a servo mechanism including a second motor having an output shaft and gear means connected to the control means for causing movement thereof, said servo mechanism also comprising;
    an amplifier having an output electrically connected to the second motor, and an input electrically connected to the output of the ratemeter; and
    a position potentiometer having a variably positioned wiper arm mechanically coupled to the control means and movable therewith and electrically connected to the input of the amplifier.

2. In an oscillographic recorder the combination of display apparatus comprising;
a recording stylus;
pivotally mounted fixture means on which the stylus is mounted;
a first motor having an output shaft;
a cam eccentrically mounted on the shaft of the said first motor for rotation therewith;
pivotally mounted follower means in contact with the cam;
a flexible linkage operably interconnecting the follower means and the said fixture means;
control means positioned on each side of the pivotal fixture means and arranged to provide a variable interspace therebetween;
a servo mechanism including a second motor having an output shaft and gear means connected to the control means for causing movement thereof, said servo mechanism also comprising;
    an amplifier having an output electrically connected to the second motor; and
    a position potentiometer having a variably positioned wiper arm mechanically coupled to the control means and movable therewith and electrically connected to the input of the amplifier.

3. An oscillographic recorder comprising;
detector means having an output and adapted to receive data;
means connected to said output for generating an electrical quantity proportional to a selected measured property of the data received;
a record carrier medium including support means therefor;
laterally oscillatable trace producing means directed onto said record carrier medium;
drive means operably interconnecting the trace producing means and the said support means to establish relative movement therebetween and to provide a longitudinal trace on said record carrier medium;
variable amplitude limiting means operably associated with the oscillatable trace producing means to limit the lateral extent of the oscillations of the trace producing means; and
control means having an input and electrical connections interconnecting said input with the said generating means and further having an output linked to the said variable amplitude limiting means, whereby the limiting means is controlled as a function of the selected property of the data received.

4. The recorder of claim 3 wherein said detector means is a scintillation detector for radioactivity and wherein the measured property of the data received therefrom is the rate of counting of radiation.

References Cited

UNITED STATES PATENTS

| | | | |
|---|---|---|---|
| 2,665,607 | 1/1954 | Blakeslee | 346—62 |
| 2,682,798 | 7/1954 | Shock | 346—62 |
| 3,070,695 | 12/1962 | Stickiney | 250—71.5 |
| 3,116,416 | 12/1963 | Reed | 250—71.5 |
| 2,749,446 | 6/1956 | Herzog | 250—71.5 |
| 2,936,375 | 5/1960 | McKay | 250—83.3 |
| 2,950,392 | 8/1960 | Campbell | 250—83 |
| 3,159,744 | 12/1964 | Stickney et al. | 250—71.5 |

OTHER REFERENCES

Technique for the Visualization of Internal Organs by an Automatic Radioisotope Scanning System by McIntyre et al., International Journal of Applied Radiation and Isotopes, 1958, vol. 3, pp. 193 to 206, Pergamon Press Ltd., London.

RALPH G. NILSON, *Primary Examiner.*

S. ELBAUM, *Assistant Examiner.*

U.S. Cl. X.R.

346—33; 128—2